United States Patent

[11] 3,542,477

| [72] | Inventors | David S. Grey<br>Lexington;<br>Robert Clark Jones, Cambridge,<br>Massachusetts |
|---|---|---|
| [21] | Appl. No. | 711,758 |
| [22] | Filed | Jan. 28, 1958 |
| [45] | Patented | Nov. 24, 1970 |
| [73] | Assignee | to the United States of America as represented by the Secretary of the Navy. by mesne assignments |

[54] HEMISPHERIC SEARCH DETECTOR
16 Claims, 9 Drawing Figs.

[52] U.S. Cl.................................................. 356/141;
250/83.3, 250/220
[51] Int. Cl.................................................. G01s 3/78;
G01b 11/26; G01c 1/00
[50] Field of Search........................................... 250/208,
220, 83.3, 214, 203, 83.3IR; 88/1M, 1(HUS), 14(MA);
244/14.3, (IR Digest), 49; 338/18, 12; 356/141

[56] References Cited
UNITED STATES PATENTS

| 2,392,873 | 1/1946 | Zuhl.............................. | 250/83.3 |
| 2,403,066 | 7/1946 | Evans............................ | 250/83.3 |
| 2,237,193 | 4/1941 | Mobsby......................... | 250/83.3 |
| 2,878,711 | 3/1959 | Blackstone.................... | 88/1 |

FOREIGN PATENTS

| 822,388 | 9/1937 | France ......................... | 250/208 |

*Primary Examiner*—Richard A. Farley
*Attorney*—L. A. Miller and M. D. Farmer

ABSTRACT: In a hemispheric search detector, a scanning and detecting device comprising a housing, means mounting the housing for rotation about an approximately vertical axis, means for rotating said housing continuously about its said axis, said housing having an outwardly exposed wall disposed at an acute angle to both th e vertical and the horizontal with a pupillike window in the wall, a spherical concave mirror disposed behind said wall in said housing and facing said window, whereby radiant energy rays entering said housing through said window may impinge on said mirror and be reflected by the mirror to a focus in front of the mirror, and arcuate convex row of individual detectors, each sensitive to radiant energy rays and operable to vary electric currents in proportion to the intensity of the radiant rays incident thereon, said detectors being disposed in said housing and facing said mirror with the row in a plane normal to said wall, and each at the focus of the mirror for radiant energy rays entering said housing through said window in directions substantially parallel to said plane and at selected inclinations, whereby said rays incident on the mirror will be reflected thereby to an approximate focus upon that one of said detectors in said row depending on the angle of inclination of said rays, and electric circuit connections to each of said detectors of said row, during rotation of said housing, whereby currents from said detectors may be compared, and the inclinations of the detected rays and the azimuth of the source of such rays determined.

INVENTOR.
DAVID S. GREY
ROBERT CLARK JONES
BY George Sipkin
Lee J. Huntzberger
ATTORNEYS

Patented Nov. 24, 1970

INVENTOR.
DAVID S. GREY
BY ROBERT CLARK JONES

George Sipkin
Lee I Shutzberger
ATTORNEYS

Patented Nov. 24, 1970

INVENTOR.
DAVID S. GREY
BY ROBERT CLARK JONES

George Sipkin
Lee N. Hrwitzberger
ATTORNEYS

Fig. 8

HEMISPHERIC SEARCH DETECTOR

This invention relates to hemispheric search detectors and more particularly to a method and means for the hemispheric scanning of the sky to locate the position of an airborne or other body emitting heat. Devices and methods for this purpose have been proposed heretofore, but the range in which they are operable and their accuracy and ease of operation have been rather limited.

An object of this invention is to provide an improved method and means for scanning the sky to locate a heat-emitting body, which will have maximum distance range and accuracy of detection, which will be relatively simple, practical and efficient, which will employ relatively simple apparatus, and which enables rapid determination at any time of the elevation and azimuth of the heat-emitting body.

Other objects and advantages will be apparent from the following description of one embodiment and example of the invention, and the novel features will be particularly pointed out hereinafter in connection with the appended claims.

Figure 5:
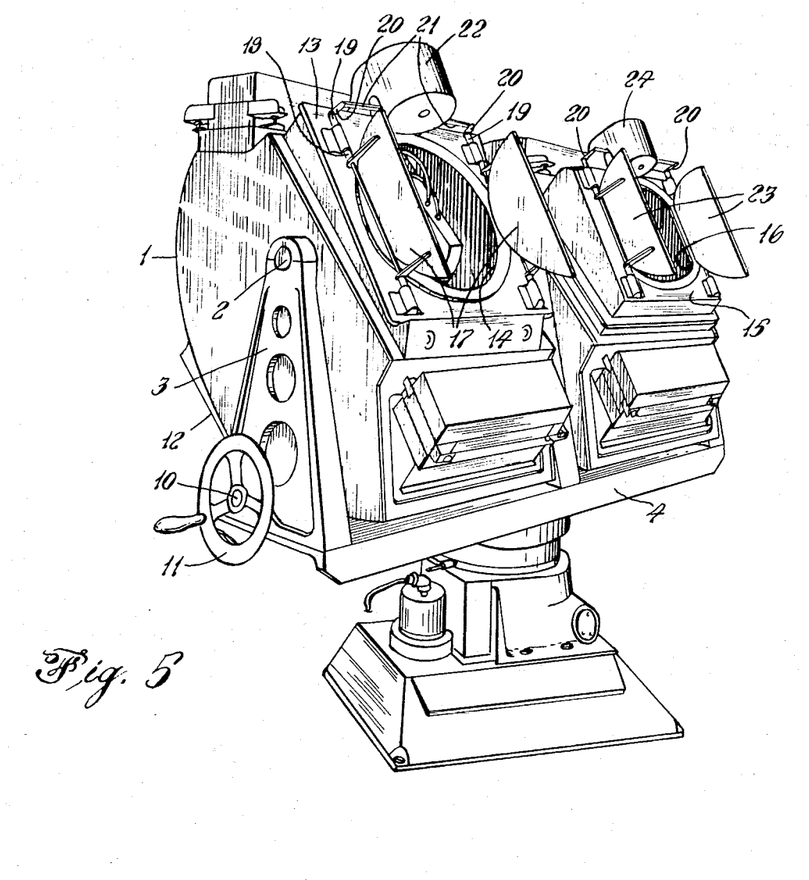
FIG. 5 is a perspective of a scanning unit constructed in accordance with this invention.
Figure 6:
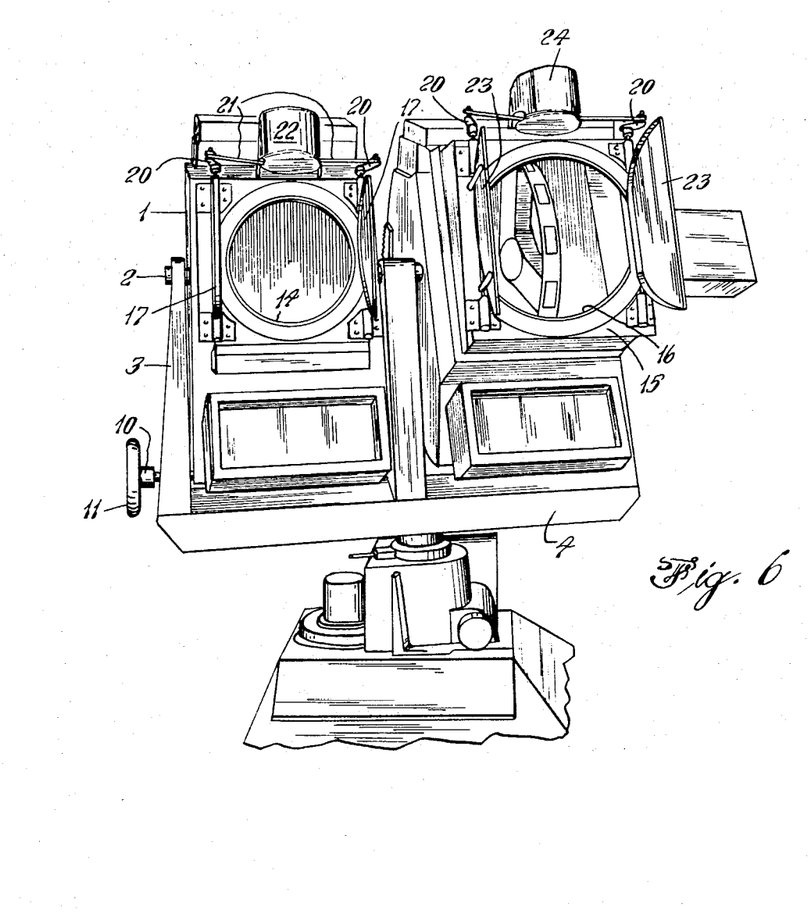
FIG. 6 is a perspective similar to FIG. 5 but viewed more from the direct front.
Figure 7:
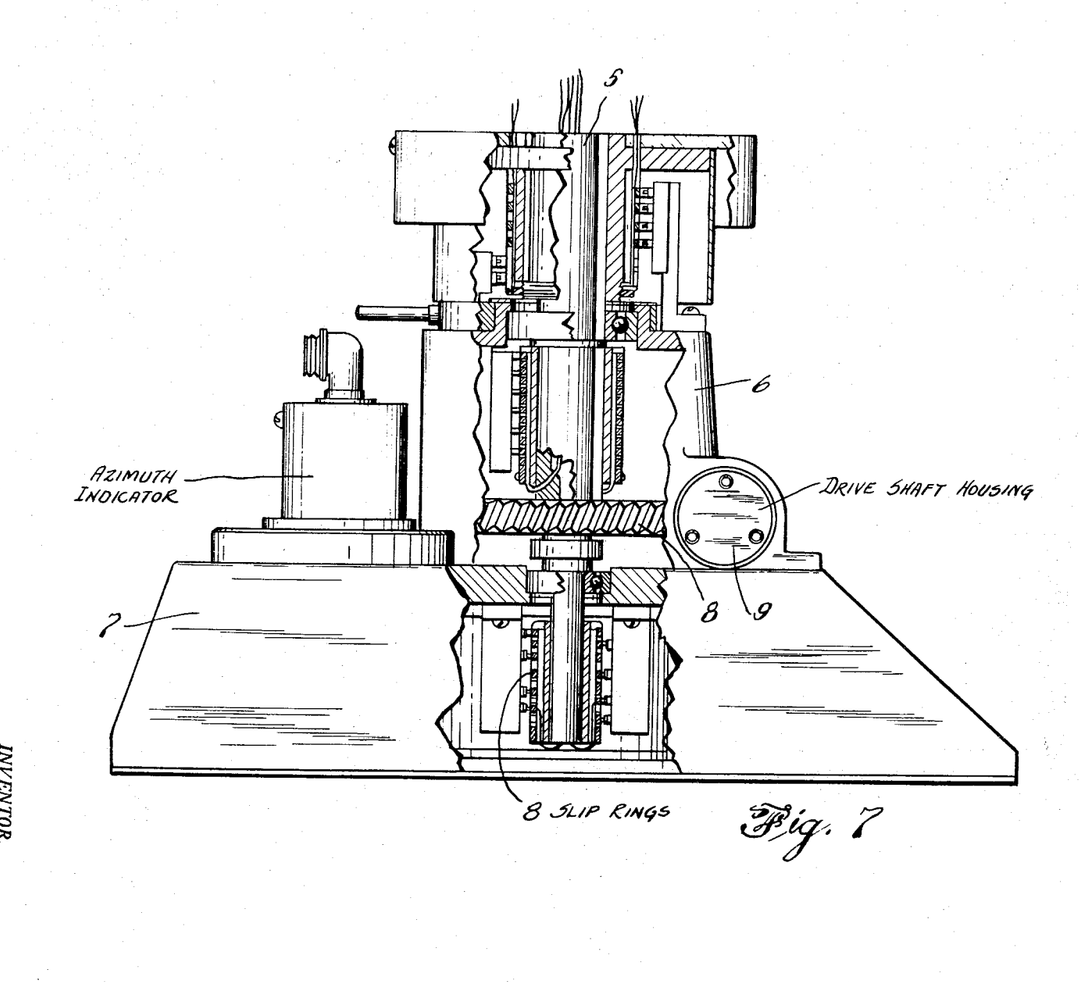
FIG. 7 is an elevation, partially in section, of the mounting for the housing.

In the illustrated embodiment of the invention, and referring first particularly to FIGS. 5 and 6, the improved scanning device includes a housing 1 having trunnions 2 at its ends which are rotatably mounted in upright arms 3 provided on a yoke 4. The yoke 4 is provided with a depending shaft 5 (FIGS. 6 and 7) which is received in the upper end of an upright pedestal 6 of the base 7 of the scanner. The shaft 5 is rotatably mounted in the pedestal 6, and fixed thereon within the pedestal 6 the shaft 5 carries a worm gear 8 which is driven by a worm screw (not shown) in the housing 9, which in turn is driven by a motor, not shown. The motor slowly rotates the shaft 5, the yoke 4 and the housing 1 about a vertical or upright axis. Mounted rotatably in one of the arms 3 is a shaft 10 (FIG. 5) having a handwheel 11 on its outer end. At its inner end the shaft 10 carries a pinion, not shown, which meshes with gear teeth on the arcuate rear periphery 12 of the housing 1. By turning the handwheel 11 the housing 1 may be rocked about the horizontal axis of its trunnions 2 to a limited extent.

The housing 1 is provided, at the side of the trunnions opposite from the rack teeth 12, with a plate 13 (FIG. 5) having an aperture 14 which serves as an entrance pupil or opening through which infrared or other heat radiation may enter the housing. Also mounted on the same face of the housing is a plate 15 parallel to the plate 13 and having an aperture 16 serving as a pupil through which infrared or other heat rays may enter that end of the housing 1. Shutter members 17 are attached by hinges 18 to the plate 13 at opposite sides of the aperture 14, so that they may be moved between a fully open position shown in FIG. 5 in which they fully uncover the aperture 14, and a position directly across and closing the aperture 14. The pintle 19 of each hinge 18 is extended endwise and provided with a crank arm 20 which is connected at its free end by link 21 to a solenoid or electromagnet contained in a casing 22. Shutters 23 are similarly provided for the aperture 16, and are operated in a similar manner from a solenoid or electromagnet contained on the casing 24, similar parts being given similar reference numerals.

The solenoid or electromagnet in each casing 22 or 24 may be activated under manual or automatic controls to move the shutters 17 and 23, from across the apertures 14 and 16 to open the same whenever desired. They should be closed when bright sunlight might enter the apertures 14 and 16. In the latter event, the bright sunlight might damage or burn out detector cells in the housing, the construction of which cells will be later described. The operation of the handwheel 11 makes it possible to tip the housing 1 to a substantial angle to both the horizontal and vertical, and thus direct the apertures 14 and 16 toward the suspected location of the heat-emitting body at some time in the rotation of the housing 1 about its vertical axis.

As the housing is rotated, either manually or motor driven, about its vertical axis it will repetitively scan the sky for a complete hemisphere, and when the apertures 14 and 16 are presented towards the source of radiation during such scanning movement, the radiant rays from such source, which are usually infrared rays, will enter the housing through the openings 14 and 16 and fall upon a related spherical mirror, 25 or disposed in the housing 1 at the wall opposite from the apertures.

The spherical mirror 25 (FIGS. 1 and 2) is disposed opposite the aperture 14 so that infrared rays entering the housing from the aperture 14 will fall upon the concave face of the spherical mirror 25 and be reflected thereby to a focus which will be along a convex arcuate line which is concentric with the arcuate curvature of the mirror in a common plane which passes through the focus and the mirror. The focus of the reflected rays will lie along this arcuate line at different positions therealong depending upon the particular angle of incidence of the light rays entering the housing through the aperture 14. Along this arcuate line where the infrared rays are focused, are located a row of individual detector cells 26 which are mounted on the convex arcuate edge of the preamplifier housing 27 but spaced apart along the row. Thus the rays will be focused by the mirror upon one or another of these individual detector cells 26 depending upon the angle of inclination at which the infrared rays enter the housing 1. This amplifier housing 27 does not extend for the full horizontal width of the aperture 14, but only for a small part thereof, so that the infrared rays entering the opening 14 may pass largely uninterruptedly to the reflecting concave surface of the spherical mirror 25 and be reflected thereby to a focus at one of the cells 26.

Figures 1, 2, 9:
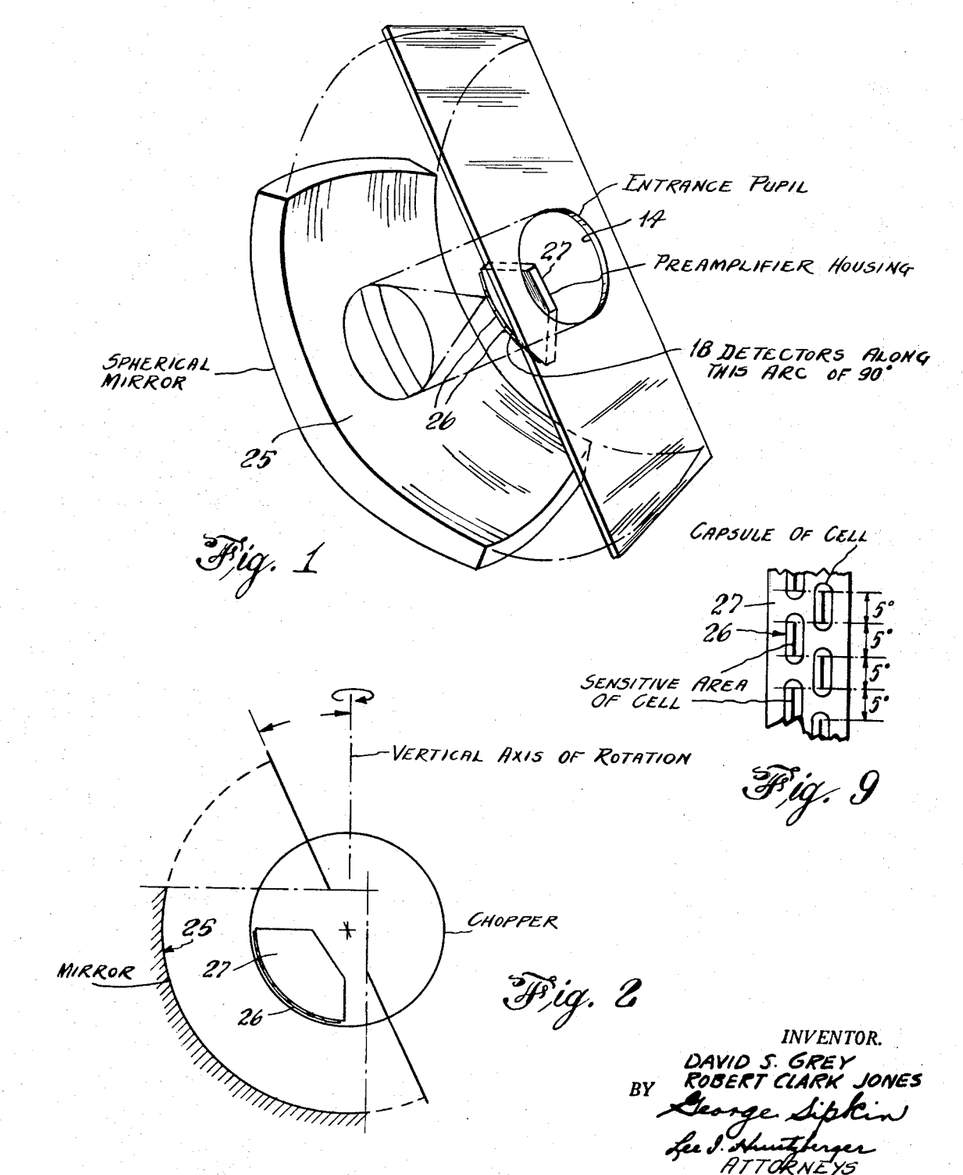
FIG. 1 is a schematic perspective illustrating the basic principle of the detector, and representing one optical part of the scanner.
FIG. 2 is a diagram illustrating the optical principles involved.
FIG. 9 is a schematic face view of the cell arrangement.

Similarly, a spherical mirror 28 (FIG. 3) is disposed in the housing directly opposite from the aperture or pupil 16, with its concave face toward the aperture 16, and a preamplifier housing 29, which is similar to the preamplifier 27 of FIG. 1, is mounted in the housing 1 in a position to present a convex, arcuate edge 30 towards the concave face of the mirror, at approximately the focus of the mirror for parallel rays entering the aperture 16. Thus the infrared rays entering the housing 1 through the aperture 16 at each side of the preamplifier housing 29 will impinge upon the concave face of the mirror 28 and be reflected thereby to a focus along the convex edge 30 of the preamplifier housing 29 at a point in that convex edge 30 dependent upon the angle of inclination at which the infrared rays enter the housing 1 through the aperture 16.

Figure 3:
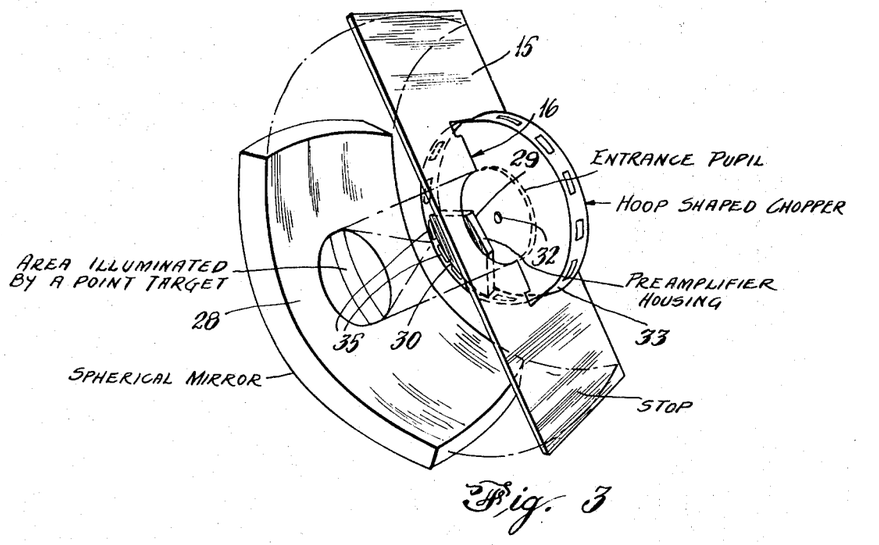
FIG. 3 is a schematic perspective, somewhat similar to FIG. 1 but illustrating a chopper employed in the optical system for another part of the scanner.
Figure 4:
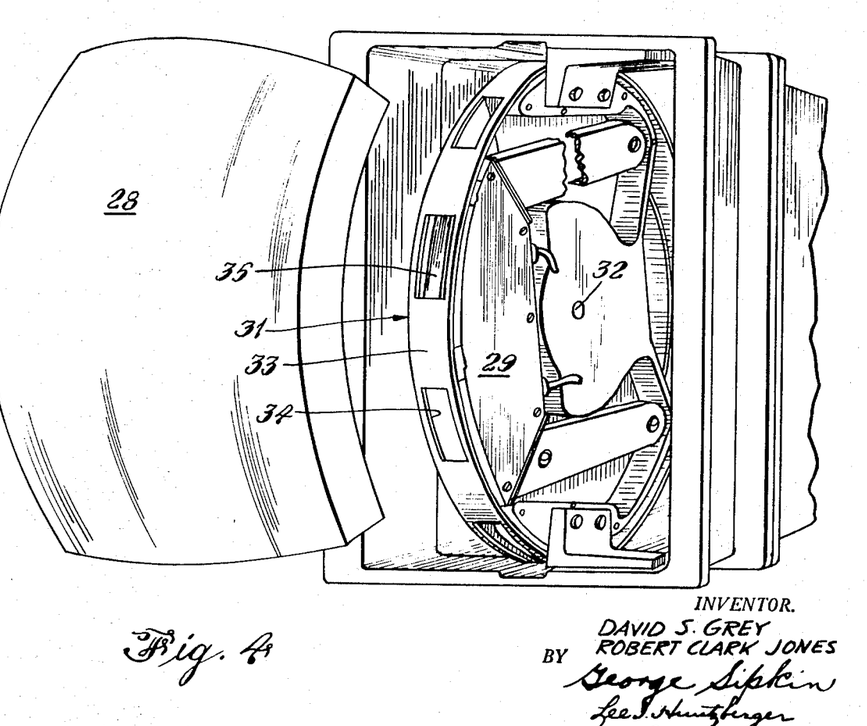
FIG. 4 is a schematic perspective of the apparatus shown in FIG. 3, but illustrating other parts associated therewith.

This arrangement is similar to that explained and illustrated in FIGS. 1 and 2, but in this part of the scanning unit a hoop shaped chopper 31 is also provided. This chopper is mounted to rotate about a trunnion 32 (FIGS. 3 and 4), and includes a cylindrical wall 33 which is disposed between the arcuate edge 30 of the housing 29 and the mirror 28. This cylindrical surface 33 is provided with a plurality of apertures 34 elongated in the direction of the circumference of the wall 33 and spaced apart end to end, as shown in FIGS. 3, 4, and 6. A plurality of cells 35 are arranged in succession along the arcuate edge 30 of the housing 29, and these cells 35 are electrically sensitive to the infrared radiation focused thereon by the mirror 28. Cells 35 may be arranged in end-to-end sequence, or overrunning side-by-side in a staggered relation as shown in FIG. 4. The chopper is rotated by a motor (not shown) at about 1800 r.p.m. and as the openings 34 pass between the mirror and cells 35, the infrared rays which are reflected upon the cells 35 by the mirror will be interrupted in a periodic manner by the impervious parts of the cylindrical surface 33 of the chopper as they pass intermittently across the reflected rays. The chopper has an axial length of its cylindrical surface 33 which is slightly greater than the axial length of the housing 29 and there is ample room on each side of the chopper for the infrared rays to enter the housing through the aperture 16 and impinge on the mirror 28.

The cells 26 are bolometer cells which are well known in the art as heat detector cells. They employ a flake or strip of a material which varies in resistance in accordance with the temperature, and the temperature is varied by the variation in the intensity of the infrared radiation which is focused on the cells by the mirror 25. An example of such a bolometer, also known as a thermistor, is disclosed in U.S. Pat. Nos. 2,414,792 and 2,414,793, to which reference may be made as examples of cells which may be used for this purpose. In addition, a preferred form of such a bolometer thermistor is illustrated and claimed in a copending U.S. Pat. application Ser. No. 691,115 filed Oct. 18, 1957. The cells 35 are photoconductive and are of a different type of cell than cells 26, yet are sensitive to infrared rays. Lead sulphide (Pbs) cells are useful as photoconductive cells. Lead selenide cells are photoconductive and are also useful as the cells 35, and although they perform more satisfactorily than the lead sulphide cells, they are not at present as readily available as the lead sulphide cells in the open market. Preamplifier means is included in each preamplifier housing 27 and 29, so as to amplify the currents passing through the cells 26 and 35. While any suitable current amplifying means may be employed, it is desirable to employ a single state electronic amplifying means because of the ability to obtain relatively large amplification of the current with mechanism disposed in a minimum of space.

From the preamplifier in each of the housings 27 and 29, the amplified currents are passed through a compressing amplifier (FIG. 8) also carried in the housing, there being one compressing amplifier 36 for each cell. From the compressing amplifier, the amplified currents are conducted by suitable wires to a slipring 37 carried on the shaft 5 (FIG. 7), and brushes 38 individually bearing on the sliprings provide for circuit connections leading from the scanning device to suitable means, not illustrated, by which the various currents from the different cells may be compared in order to determine by the intensity of the currents in the individual cells the inclination of the infrared rays which give maximum activation of certain of the cells to indicate thereby the elevation of the object whose radiation is intercepted. The azimuth of the object at the time of such maximum activation of the cells determined is by the angular position of the housing about its upright axes when maximum activation of the cells 26 and 35 is obtained. The preferred manner in which the currents to the different cells may be compared forms the subject matter of another application, and is not per se a part of the present invention.

Figure 8:
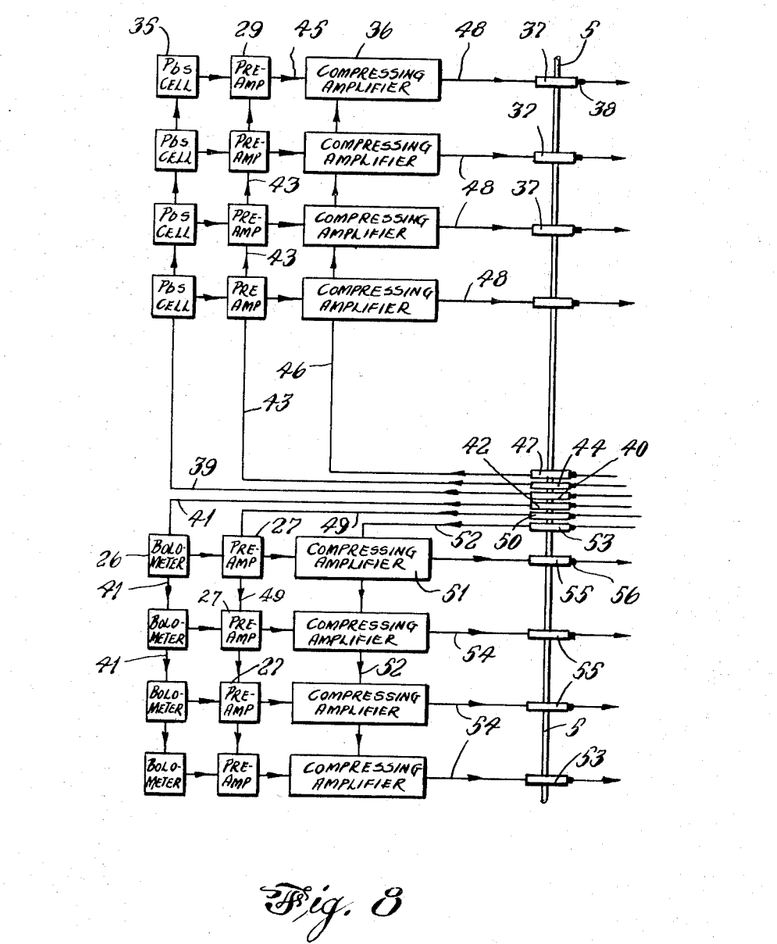
FIG. 8 is a schematic diagram of the various components of the scanning device illustrated in FIGS. 1—7.

Referring now to the diagram in FIG. 8 and to FIG. 9, any number of cells 26 and 35 may be employed for each mirror. In order to obtain a resolution of 5° in elevation angle, eighteen of the cells 26 or 35 are provided along each 90° arc. When the entire 90° arc is covered with cells, the elevation angle control (11 in FIG. 5) is unnecessary and may be omitted.

Each of the detecting elements (bolometer or lead sulfide cell) is individually placed in a sealed capsule. The geometrical limitation of the capsule has the result that the length of the capsule is nearly twice the length of the detecting element. Therefore, if the capsules were arranged end to end along the arc, there would be gaps in the range of elevation angles that could be scanned. To avoid these gaps, the cells are arranged in two side-by-side rows for the 18-cell arrangement, with half of the cells in each row and staggered with respect to those in the other row, as shown in FIG. 9. With the staggered arrangement, there are no gaps in the range of elevation angle that is covered.

In practice, it is desirable to make the range of elevation angle covered by each of the detectors overlap slightly the ranges covered by the two adjacent detectors. This avoids the possibility that a weak target might be missed if it fell on the boundary between two adjacent ranges of elevation angle.

For reasons of economy in the number of detectors and amplifiers, it may be desirable to use a smaller number of cells without sacrificing the resolution in azimuth. If this is done, the system no longer covers the entire hemisphere. In a specific embodiment, the number of detectors may be reduced to four, in which case the system covers a range of 20° in elevation angle. Since the arrangement of only four cells in a 20° arc does not cover the entire hemisphere, provision can be made, as shown in FIG. 5 and explained later herein, for a manual adjustment of the elevation angle of the two optical systems. In the drawings, only four cells have been shown for each optical system, in order to simplify an explanation of the principle of the invention, but it should be understood that considerably more cells for each optical system are advantageous for best results, preferably 18 cells for each optical system. Current is supplied to each of the cells 35 by a common wire 39 leading from a slipring 40, and current is supplied by wire 41 leading from a slipring 42 to each of the bolometer cells 26. Each lead sulphide cell 35 is connected to the related preamplifier 29, and each preamplifier is supplied with current through a wire 43 leading from a slipring 44.

Each preamplifier 29 delivers its amplified current by a connection 45 to an individual compressing amplifier 36 which is also supplied by current by a wire 46 leading from a slipring 47. The current from each compressing amplifier 36 is carried by a wire 48 to a related slipring 37, it being understood that there is a separate slipring 37 for each of the lead sulphide cells, and all of the sliprings are arranged in insulated but spaced relation to one another on the shaft 5 of the housing. Similarly, the preamplifier 27 for each cell 26 is supplied with current by wire 49 leading from a slipring 50 on the shaft 5, and a compressing amplifier 51 is provided for each of preamplifier 27. These compressing amplifiers 51 are supplied with current by wire 52 connected to a slipring 53 also on the shaft 5 that depends from the yoke of the housing. Each compressing amplifier 51 delivers an amplified current through a wire 54 to an individual slipring 55 on the shaft 5, and individual brushes 56 bears on each of sliprings 55 so as to provide for delivery of current from the different bolometer cells 26 during rotation of the housing.

The bolometer cells 26 work best on targets emitting infrared radiation having temperatures less than about 300° C. whereas the lead sulphide cells work better on targets having a temperature greater than about 300° C. It is well known to those versed in the art that with bolometer detectors, the response time constant of the detector should be matched to the time of dwell of the target radiation on the cell. Therefore if the time of dwell is short enough to lie in the range of time constants accessible with bolometers, chopping of the radiation is not desirable. On the other hand, the lead sulphide cells have their best detecting ability at a frequency that is large compared with the reciprocal time of dwell of the radiation signal. Accordingly it is desirable to chop the radiation falling on the lead sulphide cell so that the radiation signal has frequency components at the frequency of optimum detecting ability. One usually does not know the temperature of the airborne moving object to be located, and so it is advisable to use the two types of cells, which together give maximum accuracy and sensitiveness to the radiation at all temperatures of the emitting source, in determining the elevation and azimuth of the airborne object to be detected.

The housing scans the entire hemisphere repetitively, and each complete scan preferably requires about 15 seconds. The maximum angular size of the resolved element of solid angle is 5° in elevation and 2° in azimuth. The use of one optical system for a plurality of separate detector cells, represents a very definite advantage over a design employing a separate optical system for each cell, or a design employing a single detector. The chopper modulates the radiation just before the radiation falls on the detector cells, and thus modulates the radiation in such a way that the radiation forms a square wave signal with a fundamental frequency of about 360 c.p.s. In a practical embodiment of the invention, the mirrors had a radius of 11.5 inches and the chopper had a diameter of 12 inches.

In order to scan the entire hemisphere in 15 seconds, the yoke 4 on which the two optical systems are mounted in housing 1, is rotated about a vertical axis at about 4 r.p.m. The detector cells 26 divide among themselves the task of scanning the hemisphere, and each detector cell scans only a fraction of the elevation. The same applies to cells 35. In the simpler illustrated form, where four detector cells are employed in each optical system, each detector cell scans a 20° range of elevation angle, and therefore provision is made, as shown in FIG. 5, for a manual adjustment of the elevation angle of the two optical systems. The use of only four detector cells with each optical system permits the employment of smaller mirrors, and in the case of the lead sulphide cells it permits use of a flat external window, whereas if many more detector cells were used the protrusion of the chopper forwardly of the entrance pupil would require use of either a very large flat window or a smaller cylindrical or hemispherical window.

The preamplifiers 27 and 29 are located immediately adjacent to each of the detector groups of cells, in order to raise the level of the signals and reduce the impedance level of the signals so that the remaining amplification may be carried out 1 or 2 feet away from the detectors.

It will be understood that various changes in the details, materials and arrangements of parts, which have been herein described and illustrated in order to explain the nature of the invention, may be made by those skilled in the art within the principle and scope of the invention, as expressed in the appended claims.

We claim:

1. In a hemispheric search detector, a scanning and detecting device comprising a housing, means mounting the housing for rotation about an approximately vertical axis, means for rotating said housing continuously about its said axis, said housing having an outwardly exposed wall disposed at an acute angle to both the vertical and the horizontal with a pupillike window in the wall, a spherical concave mirror disposed behind said wall in said housing and facing said window, whereby radiant energy rays entering said housing through said window may impinge on said mirror and be reflected by the mirror to a focus in front of the mirror, an arcuate convex row of individual detectors, each sensitive to radiant energy rays and operable to vary electric currents in proportion to the intensity of the radiant rays incident thereon, said detectors being disposed in said housing and facing said mirror with the row in a plane normal to said wall, and each at the focus of the mirror for radiant energy rays entering said housing through said window in directions substantially parallel to said plane and at selected inclinations, whereby said rays incident on the mirror will be reflected thereby to an approximate focus upon that one of said detectors in said row depending on the angle of inclination of said rays, and electric circuit connections to each of said detectors of said row, during rotation of said housing, whereby currents from said detectors may be compared, and the inclinations of the detected rays and the azimuth of the source of such rays determined.

2. The device as set forth in claim 1, wherein the individual detectors are bolometers.

3. The device as set forth in claim 1, wherein the individual detectors are lead-containing cells, and means for periodically interrupting the impingement of said rays upon the individual detectors at a selected frequency to obtain signals from said rays that impinge on the detectors that have a higher frequency range than that produced by the detectors themselves.

4. The device as set forth in claim 1, wherein the individual detectors are lead-containing cells, and a shutter device having a rotatable shutter screen with a portion having alternating apertures and walls moving in succession between the mirror and detectors for periodically interrupting the impingement upon said detectors of the rays reflected by said mirror, at a frequency determined by the rate of passage of the apertures of said shutter screen in front of said detectors, means for rotating said screen at a selected rate to produce a desired frequency in the currents through each detector.

5. The device as set forth in claim 1, wherein said circuit connections includes sliprings and brushes along the axis of rotation of the housing establishing said circuit connections to said detectors, during rotation of the housing, from nonrotating parts of the circuit connections.

6. In a hemispheric search device, a scanning and detecting device comprising a housing, means mounting the housing for rotation about an upright axis, said housing having a wall with a window therein through which radiant rays may pass, said window lying in a plane making an acute angle to both the vertical and horizontal, a reflecting mirror disposed in said housing behind said window and upon which may impinge said rays passing through said window and reflecting said rays incident thereon to a focus lying along a row in front of the mirror, the focus in said row depending upon the angle of incidence of the rays passing through said window, a row of cells sensitive to radiant rays impinging thereon arranged along said row in spaced relation to one another along the locus of the focus of said mirror defined by rays passing through said window at a range of inclinations, means for establishing continuous circuit connections to each of said cells, from said means mounting said housing, whereby currents through said cells may be compared and the inclinations of the incident rays and the azimuth of the source of such rays determined.

7. The device as set forth in claim 6, wherein said cells are bolometers.

8. The device as set forth in claim 6, and a current amplifier for each cell for amplifying currents passing through said cells, disposed in said housing.

9. In a hemispheric search device, a scanning and detecting device comprising a housing, means mounting said housing for rotation about an upright axis, said housing having two windows therein, side-by-side through which radiant rays may pass, said windows lying in planes making acute angles to both the horizontal and vertical, a reflecting and focusing mirror behind each window in said housing and upon which said rays passing through said window may impinge, with each mirror reflecting the rays incident thereon to a focus along a row at an area in that row depending upon the inclination of the rays impinging upon the mirror, a plurality of bolometer cells arranged in succession along one of said rows and each responsive to the rays reflected thereon by one of said mirrors, a plurality of cells containing a lead compound, said cells being sensitive to radiant rays impinging thereon and arranged in succession along the other of said rows and each responsive to radiant rays reflected thereon by the other of said mirrors, shutter means disposed between said other of said mirrors and said lead-containing cells, and operable to interrupt the incidence of said rays on those lead-containing cells at a selected periodic frequency, means for establishing circuit connections to each of said cells from said housing mounting means during rotation of said housing, whereby separate currents through said cells may be compared and the inclinations of the incident rays and the azimuth of the source of such rays determined.

10. The device as set forth in claim 9, wherein said mirrors are spherical mirrors.

11. The device as set forth in claim 9, and means disposed at each window and operable selectively to prevent passage of radiant rays through each of said windows, when the intensity of such rays may damage any of said cells.

12. The device as set forth in claim 6, and ray interrupting means disposed at said window and operable selectively across said window to prevent the passage of radiant rays through that window when the intensity of such rays may damage any of said cells.

13. The method of locating the position of a moving airborne object which emits heat, which source, scanning the sky hemisphere repetitively at a selected rate of rotation, with a device for focusing incident radiant rays from said object in passing it upon cells individual to radiation from different angles of incidence of the radiation, each of which cells is responsive in its resistance to the intensity of said rays that are incident thereon, arranged in two rows where the cells of one row have maximum sensitivity to radiation from a source having a temperature less than about 300° C. and those of the other row of which have maximum sensitivity to radiation from a source having a temperature above about 300° C., interrupting the incidence of radiant rays upon the cells of said other row at a periodic rate which raises the frequency of any current variations in the cells of said other row, passing currents through said cells individually during their scanning rotation, and comparing the currents in the individual cells to enable a determination therefrom of the angle of incidence of the incident rays and the azimuth of their source.

14. The method of locating the position of an airborne body emitting heat which comprises repetitively scanning the sky at a selected rate, focusing radiant energy from said body during the scanning upon cells individual to radiant ray at different angles of incidence and whose electric resistance varies with the intensity of the radiation focused thereon, one group of which cells have maximum sensitivity to radiation from a source having a temperature below a particular temperature, and the balance of which cells have maximum sensitivity to radiation from a source having a temperature above said particular temperature, interrupting the incidence of radiation on said balance of cells at a selected periodic frequency to raise the frequency of current variations passing through those cells, passing a current through each of said cells during the scanning, and comparing the currents through the individual cells of each group of cells to enable a determination therefrom of the position of said body, by the angle of incidence of maximum radiation and the azimuth of its source.

15. The method of locating the position of a body emitting heat, which comprises repetitively scanning the sky at a selected rate, focusing radiant energy from said body during the scanning simultaneously upon two groups of cells individual to radiant energy at different angles of incidence, those of one group being photoconductive and the others heat detectors, interrupting the impingement of the radiant energy upon said photoconductive cells with a selected periodic frequency that raises the frequency of any electric currents passing through those photoconductive cells, passing individual currents through said cells during the scanning and comparing the currents through said cells to determine the azimuth in the scanning and the angle of incidence of the radiant energy focused on the cells, when maximum reception of radiant energy was received.

16. In a hemispheric search detector, a scanning and detecting device comprising a housing, means for rotating the housing about an approximately vertical axis, said housing having two separate optical systems arranged side-by-side and each operable to focus incident rays of radiant energy upon an individual focal point depending upon the vertical angle of incidence of said rays upon that system, an electrically responsive cells arranged along the locus of the focus of the mirror, those cells of one system being photoconductive, and those of the other system being heat detectors of the bolometer type, means for interrupting the impingement of rays on the photoconductive cells with a selected periodic frequency that raises the frequency of any electric currents passing through the photoconductive cells, a circuit for each of said cells, means for supplying each circuit with an electric current, whereby a comparison of the currents in the individual cell circuits will indicate the azimuth of the housing and the angle of incidence of the rays that give maximum current when radiant energy rays are focused by the optical systems.